United States Patent [19]
Pan

[11] Patent Number: 6,014,485
[45] Date of Patent: Jan. 11, 2000

[54] SHARP SKIRT OPTICAL FILTER SYSTEM

[75] Inventor: Jing-Jong Pan, Milpitas, Calif.

[73] Assignee: E-Tek Dynamics, Inc., San Jose, Calif.

[21] Appl. No.: 09/114,436

[22] Filed: Jul. 13, 1998

[51] Int. Cl.[7] .............................. G02B 6/34; G02B 6/32
[52] U.S. Cl. ............................ 385/37; 385/34; 385/140
[58] Field of Search ................................ 385/31, 33, 34, 385/37, 140, 24

[56] References Cited

U.S. PATENT DOCUMENTS

| | | | |
|---|---|---|---|
| 3,387,531 | 6/1968 | Hesse ........................................... | 88/14 |
| 4,861,136 | 8/1989 | Stone et al. .............................. | 350/96.3 |
| 5,287,214 | 2/1994 | Robertson et al. ...................... | 359/260 |
| 5,297,155 | 3/1994 | Pan et al. .................................. | 372/20 |
| 5,331,651 | 7/1994 | Becker et al. ............................. | 372/32 |
| 5,696,859 | 12/1997 | Onaka et al. ............................. | 385/24 |
| 5,781,341 | 7/1998 | Lee ........................................ | 359/578 |
| 5,841,583 | 11/1998 | Bhagavatula ........................... | 359/577 |

OTHER PUBLICATIONS

Wyatt et al., "10kHz Linewidth 1.5 μm InGaAsP External Cavity Laser With 55 nm Tuning Range", *Electronics Letters*, 19:3 (Feb. 3, 1983), pp. 110–112.

*Primary Examiner*—Hung N. Ngo
*Attorney, Agent, or Firm*—Townsend Townsend&CrewLLP

[57] ABSTRACT

Optical filters, filter systems, and methods for filtering optical signals transmitted along optical fibers provide enhanced filter performance by combining the capabilities of different types of filters particularly for dense wavelength division multiplexed systems. More specifically, the spectral skirt or transition wavelength range between a pass band wavelength range and a blocked wavelength range of a thin film pass band or dichroic filter is enhanced by arranging the thin film filter in series with one or more Fiber Bragg Gratings. The Fiber Bragg Gratings will generally reflect a portion of the signal within the spectral skirt or transition wavelength range of the thin film filter. Although short Fiber Bragg Gratings generally block a quite narrow range of signals, the steep spectral skirt of the grating, when combined with the broader wavelength response of a thin film bandpass or dichroic filter, results in a composite filter structure which exhibits the beneficial characteristics of each of its components.

16 Claims, 8 Drawing Sheets

| MATERIAL #1 $\alpha_1$ | MATERIAL #2 $\alpha_2$ | LENGTH L1 (mm) | LENGTH L2 (mm) |
|---|---|---|---|
| K VAR (Fe54/Ni29/Co17) $4.81 \times 10^{-6}$/K | STAINLESS STEEL (#AISI304 Fe/Cr18/Ni10) $18.0 \times 10^{-6}$/K | 34.25 | 16.25 |
| K VAR (Fe54/Ni29/Co17) $4.81 \times 10^{-6}$/K | Cu $17.0 \times 10^{-6}$/K | 35.59 | 17.59 |
| INVAR (Fe64/Ni36) $1.85 \times 10^{-6}$/K | STAINLESS STEEL (#AISI304 Fe/Cr18/Ni10) $18.0 \times 10^{-6}$/K | 27.98 | 9.98 |
| INVAR (Fe64/Ni36) $1.85 \times 10^{-6}$/K | Cu $17.0 \times 10^{-6}$/K | 28.63 | 10.63 |

*FIG. 6A.*

SHARP SKIRT OPTICAL FILTER SYSTEM

BACKGROUND OF THE INVENTION

1. Background of the Invention

The present invention is related to the field of fiber optic communications and networks, and more particularly, provides devices, filter systems, and methods for filtering of optical signals, especially for use in dense wavelength division multiplex systems.

A variety of optical filters have been developed to differentiate optical signals based on their wavelength. For example, thin film dichroic optical filters can selectively pass signals having wavelengths that are longer or shorter than a nominal wavelength. Specifically, low pass thin film filters selectively pass optical signals having a wavelength shorter than a maximum wavelength. High pass thin film filter, sometimes called long pass filters, pass signals with wavelengths that are longer than a minimum wavelength. Multi-cavity thin film filters are now in use to selectively pass light signals within a limited range. Such bandpass filters having fairly narrow wavelength transmission ranges (also called pass bandwidths) can currently be produced, but usually at quite high costs.

Unfortunately, thin film bandpass filters do not always provide the desired filtering performance for dense wavelength division multiplex systems. Specifically, some portion of the optical signal which is outside of the nominal pass range of a multi-cavity narrow bandpass filter typically "leaks through" with the filtered signal. This leakage can lead to cross-talk between signals of different wavelengths within the multiplexed system. To avoid cross-talk between signals of differing wavelengths, known fiber optic data transmission systems generally separate the nominal wavelengths of the multiplexed signals by about 0.8 nm or more.

Although these known wavelength division multiplex (WDM) systems are quite effective, allowing large amounts of data to be transmitted over a single optical fiber, data transmission capabilities of optical fibers would benefit significantly if the number of signals transmitted along a fiber could be increased. Fiber data transmission capabilities can be enhanced by increasing the "density" of the multiplexed signals, that is, by decreasing the separation between the discrete frequencies or wavelength of the multiplexed signals. WDM systems of increased density will require better filters.

In general, to minimize cross-talk between adjacent signals, high performance optical bandpass filters should exhibit a high transmission throughout the desired pass bandwidth, a very low transmission of signals having wavelengths outside the desired pass bandwidth, and a very narrow transition bandwidth between the high transmission and low transmission ranges. A high performance filter having a narrow spectral transition zone is said to have a "steep skirt," as can be understood by viewing a graph of the transmission response over a range of wavelengths or frequencies. As a portion of the signal will be transmitted and a portion of the signal will be blocked within this skirt region, it is particularly desirable to minimize the bandwidth of this transition region in high performance filters for dense wavelength division multiplex systems so as to minimize cross-talk. High performance bandpass filters should also provide an even or "flat-top" transmission spectrum throughout the pass bandwidth, with very small (or no) ripples atop the transmission spectral shape.

Several different filter structures have been proposed in previous attempts to increase the channel density of multiplex systems. Work in connection with the present invention has shown that it is possible to fabricate high performance thin film filters having a large number of coating layers so as to provide multiple resonator cavities. While such multi-resonator thin film filters can provide fairly good performance, manufacturing limitations make it extremely difficult to fabricate these thin film structures with the desired combination of a narrow pass bandwidth, a sharp skirt, and an accurate center wavelength. Additionally, thin film filters having four or five resonator cavities may include as many as 150 thin film layers. The deposition of each of these layers stresses the underlying structure, and the release of this stress after fabrication is complete may shift the wavelength response of the filter. This Limits the temperature stability and lifetime of these expensive structures, while the large number of layers may result in relatively high signal loss and an undesirable ripple in the passband of the transmission spectrum. As a result, multi-resonator multi-layer thin film coated filter structures are plagued by a low manufacturing yield, a high failure rate, and a very high cost, while still often falling short in some of the important requirements for filtering of dense wavelength division multiplex systems.

A much lower cost structure for selectively filtering optical signals is the Fiber Bragg Grating. However, each Fiber Bragg Grating is a reflective device that is generally limited to a very narrow reflective bandwidth. When a large number of these gratings are combined to perform as a bandpass filter, the gratings often extend along an excessive fiber length. Other proposed Fiber Bragg Grating-based filtering structures require precise (and expensive) phase alignment and couplers. Moreover, these proposed systems re-inject the pass band wavelength into the signal input fiber (so that additional, and often expensive, optical fiber devices are included to effect bandpass transmission from these reflective gratings), and are generally sensitive to temperature variations.

In light of the above, it would be desirable to provide improved optical filter devices, systems, and methods for separating optical signals of differing wavelengths. It would be particularly desirable to provide improved bandpass and dichroic filters for use in dense wavelength division multiplexed systems and networks. It would further be desirable if these improved structures and methods provided steep skirts for wavelength signal multiplexing and de-multiplexing, wavelength routing, switching, connecting, and other multiple wavelength operations. These improved filtering techniques should ideally exhibit accurate operation wavelengths, low insertion loss, low ripples, near zero temperature effects, low polarization dependent loss, high return loss, flat pass band response, and a skirt sufficiently sharp to minimize channel cross-talk when the wavelength separation between optical signals is decreased below that of existing dense wavelength division multiplexed systems.

SUMMARY OF THE INVENTION

The present invention provides optical filters, filter systems, and methods for filtering optical signals such as those transmitted along optical fibers. To provide enhanced filter performance, the present invention generally combines the capabilities of different types of individual filter structures to provide a high performance filtering system which is particularly useful for dense wavelength division multiplexed systems. More specifically, a skirt or transition wavelength range between a pass band range and a blocked range of a pass band or dichroic thin film filter can be minimized by combining the filter in series with one or more Fiber Bragg Gratings. The Fiber Bragg Grating will generally reflect a portion of the signal within the transition wavelength range of the thin film filter. Although short Fiber Bragg Gratings generally block a quite narrow range of signals, the steep skirt of the grating, when combined with the broader wavelength response of the thin film filter, results in a composite filter structure which exhibits the beneficial characteristics of each of its components.

Throughout the following, the structures and methods for the present invention will be described with reference to "a" Fiber Bragg Grating, "the" Fiber Bragg Grating, and the like. It should be understood that these terms encompass the use of one or more Fiber Bragg Gratings, as the invention will often include multiple gratings.

In a first aspect, the present invention provides an optical filter system comprising an input optical fiber, and a filter disposed in an optical path of an optical signal from the input fiber. The filter transmits the signal in a pass wavelength range, and blocks the signal in a block wavelength range. The filter partially transmits, and partially blocks, signals throughout a skirt wavelength range separating the pass range and the block range. A first Fiber Bragg Grating is disposed in the optical path from the input fiber. The first Fiber Bragg Grating blocks at least a portion of the signal within the skirt range of the filter. An output optical fiber is disposed in the path of the signal from the filter and the first Fiber Bragg Grating. The filter system partially transmits and partially blocks the signal from the input fiber to the output fiber throughout a skirt wavelength range of the filter system. The skirt range of the filter system is significantly smaller than the skirt range of the filter.

Generally, the filter comprises a plurality of thin film coating layers disposed across the optical path of the signal. These coating layers transmit the signal in the pass range of the filter, and block the signal in the block range of the filter. In some embodiments, the filter will comprise a bandpass filter that blocks the signal below and above a pass wavelength range. To minimize the skirt or transition zone between the pass and block ranges, one Fiber Bragg Grating will often block signals near a minimum pass wavelength range, while another Fiber Bragg Grating blocks the signals near a maximum pass wavelength range of the thin film filter. The Fiber Bragg Gratings may be disposed before, after, or on either side of the filter. In the exemplary embodiment, Fiber Bragg Gratings are at least partially superimposed. This allows the use of a relatively compact temperature compensation structure to avoid temperature induced variations in the wavelength response of both Fiber Bragg Gratings.

In many embodiments, GRIN lenses will be disposed between the input and output fibers so as to expand and collimate the signal passing through the filter. Conveniently, a second output fiber may be positioned adjacent the input fiber, and the system may be arranged so that signals blocked by the filter are focussed into the second output fiber. This arrangement can provide wavelength de-multiplexing with very low cross-talk between adjacent signals in dense wavelength division multiplex systems having signals separated by less than 1.0 nm in wavelength, and ideally by less than 0.75 nm in wavelength.

In another aspect, the present invention provides an optical filter system comprising an input optical fiber and a thin film bandpass filter disposed in an optical path of an optical signal from the input fiber. The bandpass filter transmits the optical signal in a pass wavelength range extending from a low pass wavelength to a high pass wavelength. The bandpass filter blocks the optical signal below and above the pass range. A first output optical fiber is disposed in the optical path from the bandpass filter. A first Fiber Bragg Grating is disposed in the optical path between the input fiber and the first output fiber. The first Fiber Bragg Grating blocks optical signals adjacent the low pass wavelength. A second Fiber Bragg Grating is disposed in the optical path between the input fiber and the output fiber. The second Fiber Bragg Grating blocks optical signals adjacent the high pass wavelength.

In another aspect, the present invention provides an optical filter system comprising an input optical fiber and first and second output optical fibers. A thin film dichroic filter is disposed in an optical path of an optical signal from the input fiber. The dichroic filter directs the optical signal below a skirt wavelength range toward the first output fiber. The dichroic filter directs the optical signal above the skirt wavelength range toward the second output fiber. A first Fiber Bragg Grating is disposed in the optical path between the input fiber and dichroic filter. The first Fiber Bragg Grating blocks optical signals within the skirt wavelength range.

BRIEF DESCRIPTION OF THE DRAWINGS

FIG. 6A describes materials and dimensions for fabricating the temperature compensation structure of FIG. 6.

DETAILED DESCRIPTION OF THE SPECIFIC EMBODIMENTS

The present invention generally provides improved optical filters, filter systems, and filtering methods. The filtering systems of the present invention generally exhibit a very narrow transition or skirt wavelength range between optical signals which are efficiently transmitted by the filter system, and signals which are sufficiently blocked by the filter system so as to prevent cross-talk. This narrow filter skirt wavelength range, often called a steep skirt, enhances the density with which wavelength division multiplexed signals can be transmitted within optical fiber system or network.

The optical filter systems and methods of the present invention may be adapted to allow bandpass filtering of optical signals within a narrow wavelength, and can still exhibit very steep skirts which limit cross-talk between tightly spaced signals along the wavelength scale. Additionally, the present invention is well adapted for use in dichroic filtration in both low pass filter systems and high pass filter systems. Hence, these structures and methods are well suited for wavelength multiplexing and de-multiplexing, wavelength routing, switching, connecting, and multiple wavelength operations in general.

As a result of the advantageous properties of these structures, the present invention is well adapted for use in dense wavelength division multiplexing systems in the areas of telecommunications, data communications, cable television, sensors, military command and control environments, optical signal processing (including phased array antenna applications), surveillance/tracking/pointing applications, specialized radar systems, wireless communications, and the like.

As used herein, a filter or filter system which blocks a signal or signal portion provides a sufficient loss in that signal or signal portion such that the probability of contamination of any other signal is negligible. Those of skill in the art should recognize that a low power residual signal within the blocked frequency range may still be present. Additionally, pass signal wavelength ranges that are nominally transmitted or passed by a filter may still incur some insertion loss.

Figure 1:
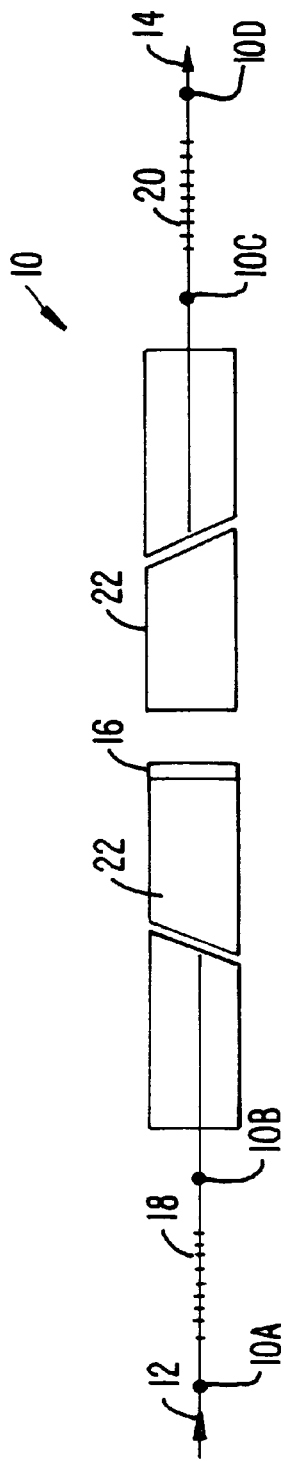
FIG. 1 illustrates a bandpass filter structure according to the principles of the present invention.

Referring now to FIG. 1, a bandpass filter system 10 selectively transmits optical signals within a bandpass wavelength range from an input optical fiber 12 to an output optical fiber 14. Bandpass filter system 10 includes a thin film bandpass filter 16 optically coupled in series with first and second Fiber Bragg Gratings 18, 20. In the exemplary embodiment, quarter-pitch (or near quarter-pitch) GRIN (Graded Index) lenses are disposed between the input fiber 12 and bandpass filter 16, and also between the bandpass filter and output fiber 14.

Figure 1A:
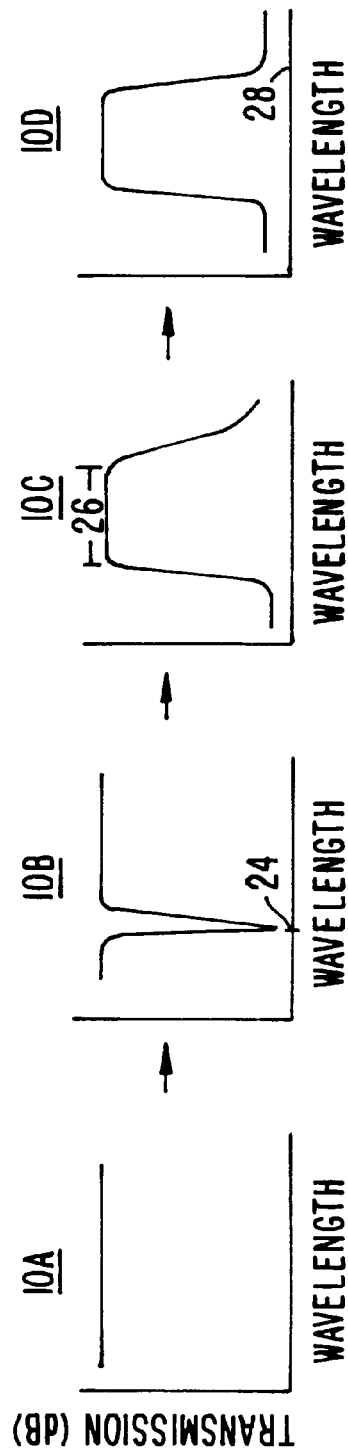
FIG. 1A illustrates the transmission/wavelength curve between the components of the filter system of FIG. 1.

The sequential effects of the components of filter system 10 on the signal response can be understood with reference to FIGS. 1 and 1A. Light signals, which enter input fiber 12 are transmitted substantially uniformly to a theoretical node 10A before first Fiber Bragg Grating 18. First Fiber Bragg Grating 18 transmits much of the wavelength spectra to node 10B without loss, but greatly reduces transmission about a first grating wavelength 24, as illustrated in FIG. 1A. The signal is then transmitted through bandpass filter 16, which blocks transmission of a signal which is substantially above or below a pass signal range 26.

When the signal reaches theoretical node 10C, the combination of first grating 18 and bandpass filter 16 provides a steep gradient or skirt between the pass band wavelength range and shorter wavelength signals. This contrasts sharply with the relatively wide skirt or low gradient provided at the upper end of the bandpass range, where bandpass filter 16 alone separates signals within the pass bandwidth from signals of greater wavelength. This wide upper skirt is narrowed by second Fiber Bragg Grating 20 as the signal is transmitted from node 10C to output fiber 14 at node 10D, with the second grating blocking signals about a maximum pass wavelength 28. The combined effect of these optical components produces very steep gradients in the transmission response at the upper and lower wavelength limits of the pass bandwidth.

Figure 2:
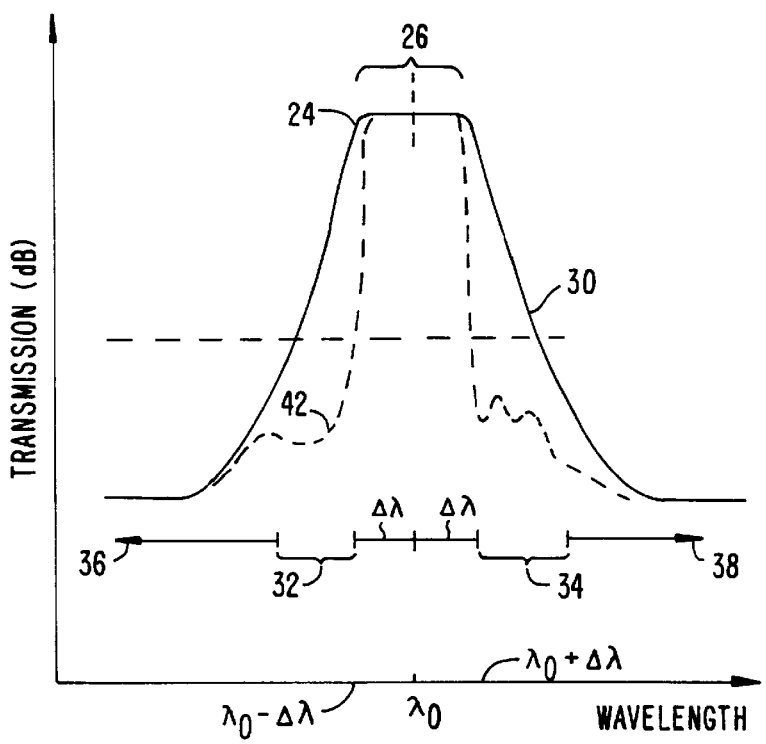
FIGS. 2 and 2A illustrate the wavelength response of the filter system of FIG. 1, and also show the wavelength response of the components of that system.
Figure 2A:
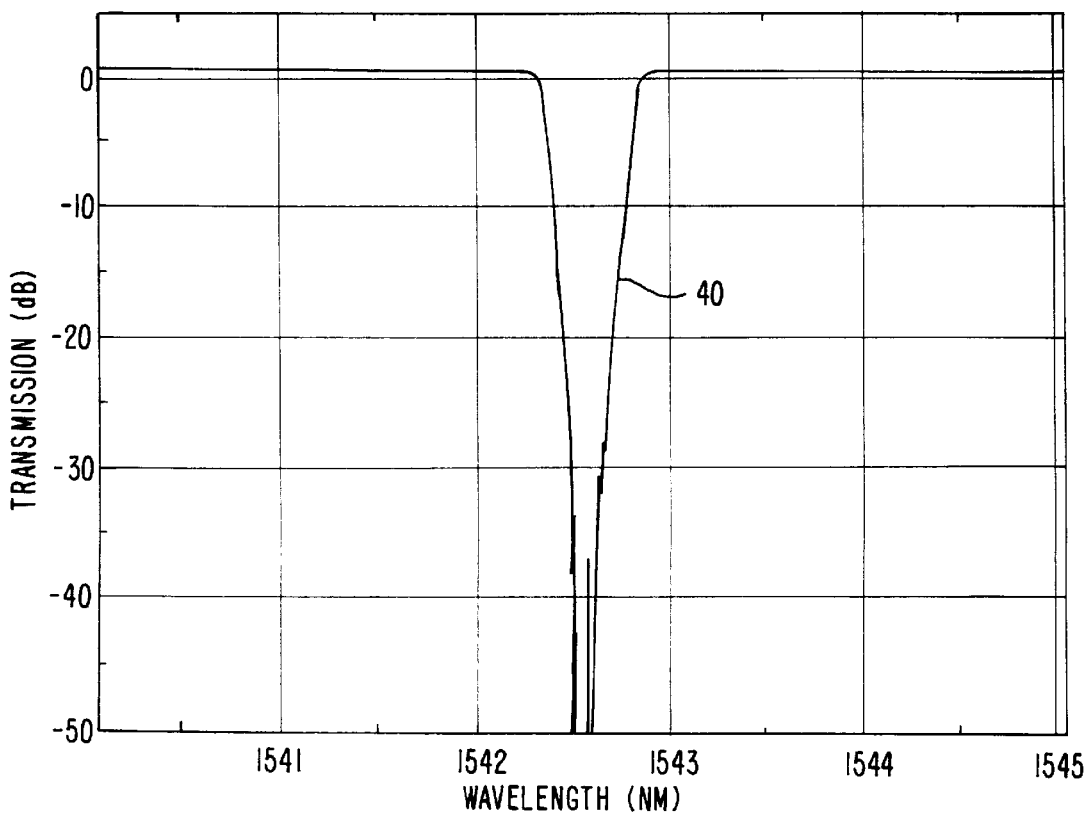

The transmission response of bandpass filter 16, the Fiber Bragg Gratings, and bandpass system 10 are illustrated in more detail in FIGS. 2 and 2A. When used in isolation, bandpass filter 16 efficiently transmits signals about a nominal wavelength $\lambda_0$. However, curve 30 shows the wide skirt of bandpass filter 16, with changes in wavelength exhibits a relatively low gradient above and below a nominal pass wavelength range ($\lambda_0-\Delta\lambda$ to $\lambda_0+\Delta\lambda$). In other words, bandpass filter 16 in-part transmits, and in-part blocks signals within wide upper and lower skirt wavelength ranges 32, 34. As a result, when bandpass filter 16 is used alone, the wavelength separation between adjacent multiplexed signals must be quite broad to avoid cross-talk. Nonetheless, bandpass filter 16 does effectively block signals having wavelengths in a low range 36 below lower skirt 32, and in a high range 38 above upper skirt range 34.

To improve the performance of bandpass filter system 10, the present invention makes use of the very steep gradient in the transmission/wavelength response curve 40 of Fiber Bragg Gratings, as illustrated in FIG. 2A. Where it is desired to transmit signals within a pass bandwidth 26 about a nominal frequency $\lambda_0$ (here from $\lambda_0-\Delta\lambda$ to $\lambda_0+\Delta\lambda$), first Fiber Bragg Grating has a first grating wavelength 24 of approximately $\lambda_0-\Delta\lambda$. Similarly, second Fiber Bragg Grating 20 has a second grating wavelength of approximately $\lambda_0+\Delta\lambda$. By combining Fiber Bragg Gratings 18, 20 with bandpass filter 16, bandpass system 10 provides a transmission/wavelength plot 42 having upper and lower skirt ranges which are significantly smaller than those of the thin film bandpass filter alone.

Figure 3:
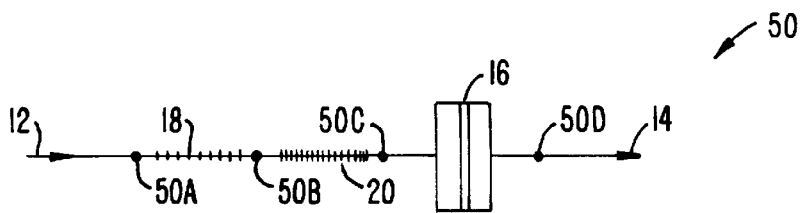
FIGS. 3 and 3A schematically illustrate a bandpass filter system in which a pair of Fiber Bragg Gratings are disposed in an optical path before a bandpass filter, together with the wavelength response between the system components.
Figure 3A:
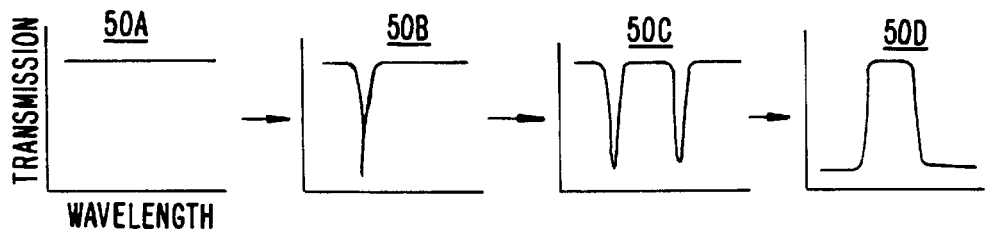
Figure 4:
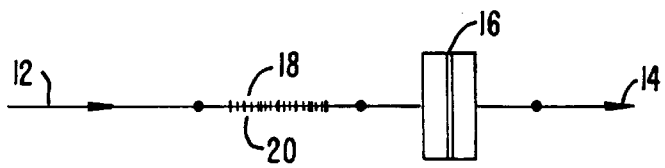
FIGS. 4 and 4A schematically illustrate the structure and wavelength response of a filter system in which a pair of superimposed Fiber Bragg Gratings are disposed before a bandpass thin film filter.
Figure 4A:
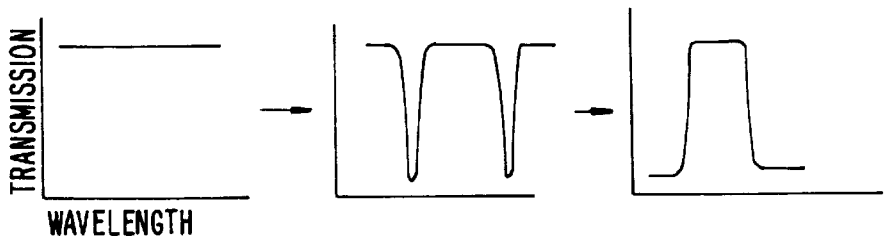

Referring now to FIGS. 3 and 3A, an alternative bandpass filter system 50 is schematically illustrated. Alternative bandpass filter system 50 includes many of the components of filter system 10, but herein includes both first and second Fiber Bragg Gratings 18, 20 disposed before bandpass filter 16. As can be understood with reference to the transmission/wavelength characteristics at theoretical nodes 50 A, B, . . . , the resulting performance of this alternative filter system is substantially similar to that of filter system 10.

Still further arrangements of these components are possible, as can be understood with reference to FIGS. 4, 4A, 5, and 5A. In these embodiments, first and second Fiber Bragg Gratings 18, 20 are superimposed on a common portion of an optical fiber. As is explained in more detail in co-pending U.S. patent application Ser. No. 09/114,309, filed concurrently herewith (Attorney Docket No. 13011-007200), the full disclosure of which is incorporated herein by reference, superimposing Fiber Bragg Gratings having differing grating periods can result in a significantly more compact structure than serially arranged gratings.

Fiber Bragg Gratings generally comprise a periodic change in the effective refractive index along an optical fiber. This periodic alteration of the refractive index may be produced by selectively irradiating portions of a light sensitive fiber. Each of the Bragg Gratings is imposed by exposing this light sensitive fiber at discrete axial positions, most often with a uniform spacing. By superimposing two different periodic spacings, work in connection with the present invention has shown that two different specific frequencies can be reflected from along a single length of the fiber, thereby minimizing dispersion of the reflected signal, and also decreasing overall length of the grating and filter system.

Unfortunately, Fiber Bragg Gratings often have a significant temperature sensitivity. For example, the resonant wavelength of a Fiber Bragg Grating may vary as much as 0.01 nm/degree C. This temperature sensitivity is significantly higher than the sensitivity of filters formed using thin film coating techniques, which typically provide resonant frequencies which vary about 0.003 nm/degree C.

In the filter systems of the present invention, both the skirt gradient and cut-off frequencies will primarily be defined by the Fiber Bragg Gratings. This could mean that the overall filter system temperature sensitivity would be significantly greater than that of an all thin film filter system. However, a number of temperature compensation packages have been proposed to decrease and/or substantially eliminate the temperature sensitivity of Fiber Bragg Gratings. As a result, it may be possible to provide filter systems which have temperature sensitivities approximating those of thin film filters, and ideally, having temperature sensitivities that are less than those of the thin film filter.

Figure 5:
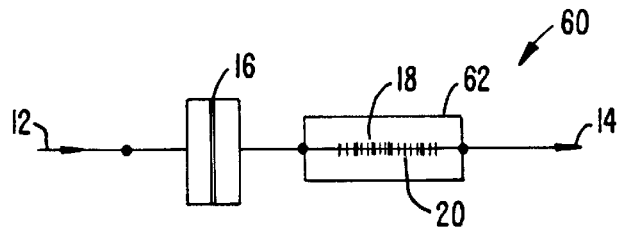
FIGS. 5 and 5A schematically illustrate the structure and wavelength response of a filter system in which a bandpass filter is disposed before a pair of superimposed Fiber Bragg Gratings, in which the Fiber Bragg Gratings are supported by a structure that compensates for variations in temperature.
Figure 5A:
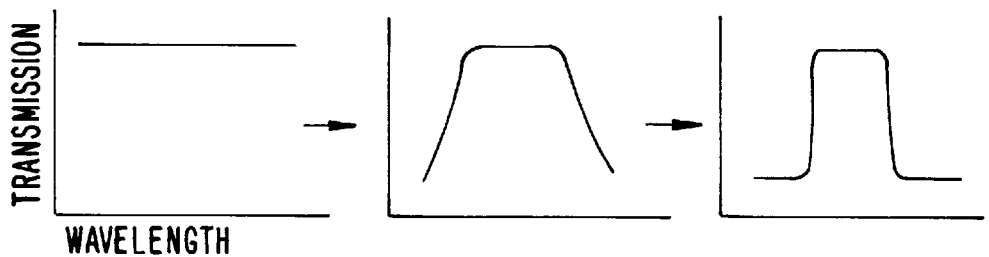

In the exemplary embodiment illustrated in FIG. 5, a temperature compensated filter system 60 includes superimposed first and second Fiber Bragg Gratings 18, 20 supported by a temperature compensation structure 62. In general, temperature compensation structure 62 overcomes a disadvantageous variation in the wavelength response of the Fiber Bragg Grating with changes in temperature. Temperature compensation structure 62 will be formed of materials having desirable coefficients of thermal expansion. The structure will support the fiber in tension such that tension in the fiber varies with changes in temperature so as to compensate for the effects of changing temperature on the wavelength response of the grating. This arrangement will generally compensate for variation in wavelength response of Fiber Bragg Gratings induced by both the thermal coefficient of expansion and by the refractive index thermal coefficient of the grating materials.

Figure 6:
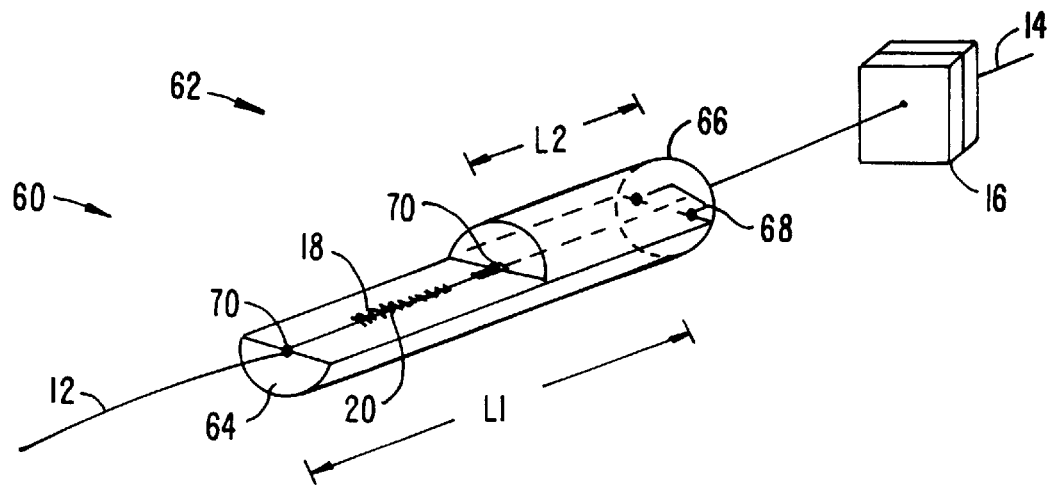
FIG. 6 illustrates an exemplary temperature compensation structure for use in a filter system of FIG. 5.

An exemplary structure for temperature compensation package 62 is illustrated in FIG. 6. Package 62 includes a first half cylinder 64 having a length of L1. First half cylinder 64 is formed of a first material having a first coefficient of thermal expansion, the first material generally having a relatively small coefficient of thermal expansion, and ideally comprising Kovar™, Invar™, or the like. First half cylinder 64 may include an axial groove to accommodate Fiber Bragg Gratings 18, 20.

Package 62 further includes a second half cylinder 66. Second cylinder 66 is affixed to first cylinder 64 by weld 68, which may comprise spot welds, laser welds, or the like. The cylinder halves may alternatively be adhesively bonded to each other, fastened together, affixed indirectly through a third member, or the like. Second half cylinder 66 comprises a second material having a second thermal coefficient of expansion, and has an overall length of L2. The thermal coefficient of expansion of second half cylinder 66 is typically significantly greater than that of first half cylinder 64. Second half cylinder may also include an axial groove, or a groove may optionally be imposed on only one or the other of the half cylinders.

The optical fiber is coupled to the compensation package 62 by adhesive 70. Filter 16 may be disposed beyond the ends of the compensation package. Regardless, adhesive 70 will generally support Fiber Bragg Gratings 18, 20 in tension, and the amount of tension will typically decrease as the temperature of the package increases so as to avoid temperature induced wavelength variations in the response of the Fiber Bragg Gratings.

To calculate the lengths and desired properties of the temperature compensation package, we begin with the wavelength response of a Fiber Bragg Grating. Ordinarily, a Fiber Bragg Grating wavelength $\lambda$ can be calculated from the equation $$\lambda = 2 \cdot n_{eff} \cdot \Lambda$$

in which $\Lambda$ is the periodic spacing of the Fiber Bragg Grating, and in which $n_{eff}$ is the effective overall index of refraction of the fiber. As temperature T changes, $$\frac{d\lambda}{dT} = 2 \cdot n_{eff} \cdot \frac{d\Lambda}{dT} + 2 \cdot \Lambda \cdot \frac{dn_{eff}}{dT}$$

so that $$\frac{d\lambda}{\lambda dT} = \frac{d\Lambda}{\Lambda dT} + \frac{dn_{eff}}{n_{eff} dT}$$

in which $d\Lambda/\Lambda dT$ is the optical fiber thermal coefficient of expansion. From experience, we have found that $d\lambda/dT$ is roughly equal to 0.011 nm/degree K. Assuming $\lambda$ is equal to 1,550 nm, we derive that for unsupported Fiber Bragg Gratings:

$$\frac{d\Lambda}{\Lambda dt} + \frac{dn_{eff}}{n_{eff} dT} = \frac{d\lambda}{\lambda dT} = \frac{0.011 \text{ nm/K}}{1550 \text{ nm}} = 7.1 \times 10^{-6} \text{ K}^{-1}$$

Where Fiber Bragg Gratings are supported by temperature compensation structure 62, we should also consider the effects of thermal expansion on the package supporting the Fiber Bragg Gratings. Where $\alpha1$ is equal to the coefficient of thermal expansion of the first material, and where $\alpha2$ is equal to the coefficient of thermal expansion of the second material, we find that:

$$\frac{d\lambda}{\lambda dt} = \frac{d\Lambda}{\Lambda dT} + \frac{dn_{eff}}{n_{eff} dT} + \frac{(\alpha1 \cdot L1 - \alpha2 \cdot L2)}{L1 - L2}$$

so long as $\alpha2$ is greater than $\alpha1$. As our goal is to have little or no change in wavelength induced by a change in temperature, we set $$\frac{d\Lambda}{\Lambda dt} + \frac{dn_{eff}}{n_{eff} dT} + \frac{(\alpha1 \cdot L1 - \alpha2 \cdot L2)}{L1 - L2} = 0$$

substituting from our formula derived above, we therefore have that:

$$\frac{(\alpha1 \cdot L1 - \alpha2 \cdot L2)}{L1 - L2} = -7.1 \times 10^{-6} \text{ K}^{-1}$$

From this last equation, we can calculate the length of the first and second half cylinders 64, 66 for selected first and second materials. To provide a reasonable length for superimposed Fiber Bragg Gratings 18, 20, we set L1-L2 equal to 18 mm. Assuming first half cylinder 641 comprises a material which changes little in length (such as Kovar™ or Invar™) and using widely available materials (such as stainless steel or copper) for the second half cylinder, we can calculate the lengths of the first and second half cylinders as specified in FIG. 6A.

While the exemplary temperature compensation structure described above is both accurate and highly cost effective, a number of other temperature compensation packages might also be used. Examples include the structures described in Provisional Patent Application No. 60/047,937, filed May 29, 1997. A wide variety of alternative structures may also be employed within the scope of the present invention.

Figure 7:
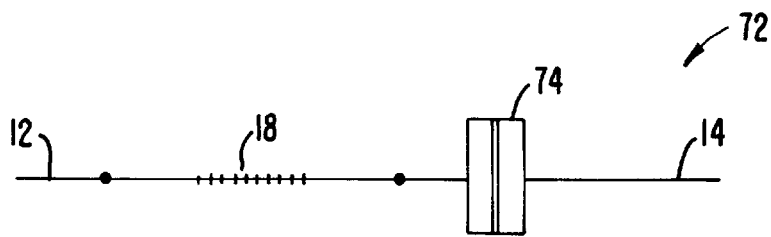
FIGS. 7 and 7A schematically illustrate the structure and wavelength response of a high pass filter system in which a Fiber Bragg Grating is disposed before a high pass filter.
Figure 7A:
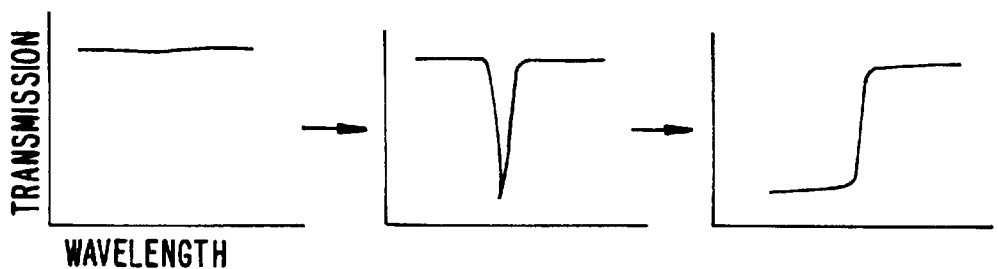
Figure 8:
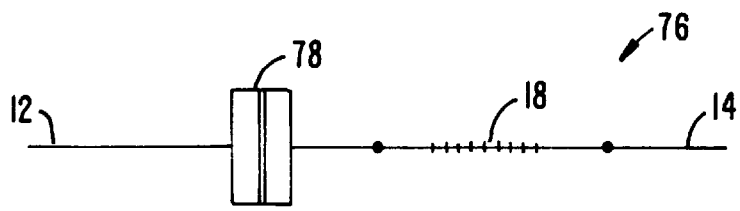
FIGS. 8 and 8A schematically illustrate the structure and wavelength response of a low pass filter system in which a low pass filter is disposed before a Fiber Bragg Grating.
Figure 8A:
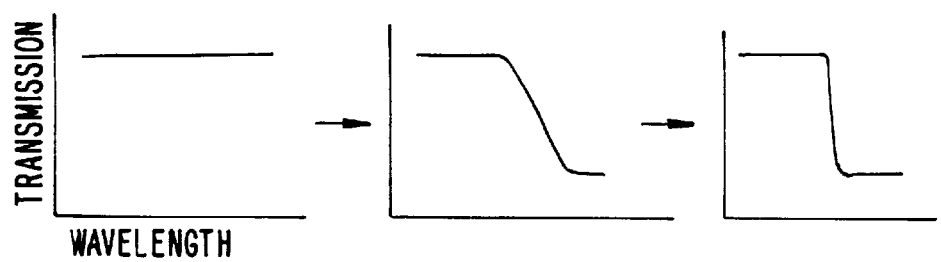
Figure 7B:
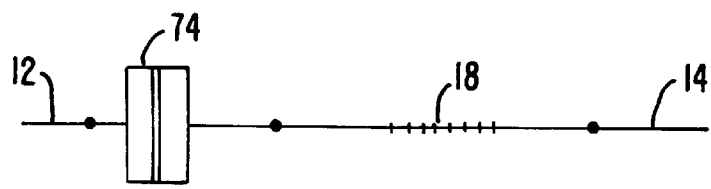
FIGS. 7B and 7C schematically illustrate the structure and wavelength response of a high pass filter system in which a Fiber Bragg Grating is disposed after a high pass filter.
Figure 7C:
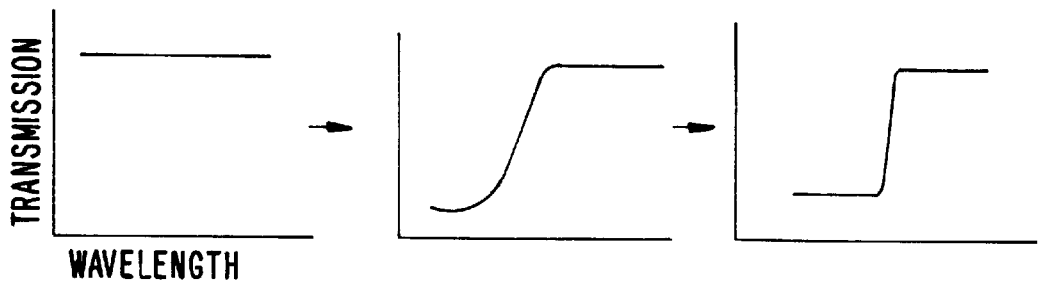
Figure 8B:
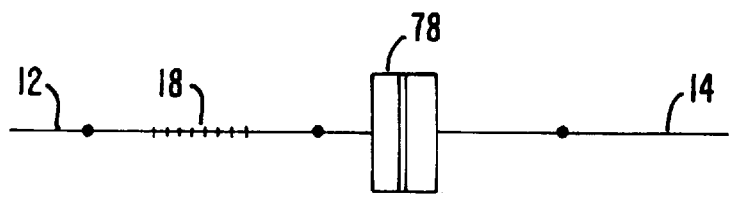
FIGS. 8B and 8C schematically illustrate the structure and wavelength response of a low pass filter system in which a low pass filter is disposed after a Fiber Bragg Grating.
Figure 8C:
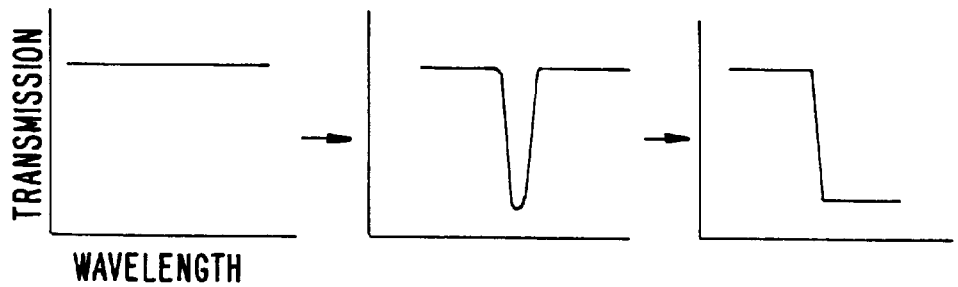

Referring now to FIGS. 7–8B, thee combination of Fiber Bragg Gratings and thin film filtering structures is also useful to provide high performance dichroic filtering systems. High pass filtering system 72 includes a single Fiber Bragg Grating together with a high pass (sometimes called a long pass) thin film filter 74 to provide a sharp skirt high pass filter system. Similarly, low pass filter system 76 includes a low pass thin film filter 78 with a Fiber Bragg Grating so as to provide a sharp skirt low pass filter performance, as illustrated in FIGS. 8 and 8A. As can be understood with reference to FIGS. 7B and 7C, and to FIGS. 8B and 8C, the order of the sequential optical components can be rearranged as desired.

Figure 9A:
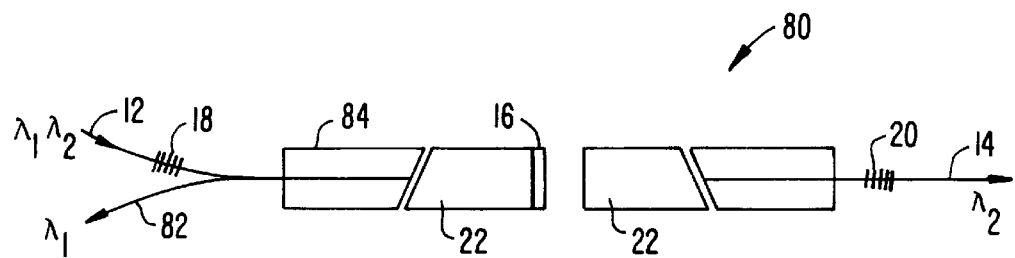
FIGS. 9A and 9B illustrate de-multiplexers including the filter system of the present invention.

The filter systems of the present invention are also useful in a variety of additional components of optical networks, as can be understood with reference to FIG. 9A. For example, a wavelength division de-multiplexer 80 includes first and second Bragg Gratings 18, 20 disposed between input fiber 12 and output fiber 14, together with a bandpass filter 16, as described above. Bandpass or dichroic filter 16 selectively passes signals having a wavelength of $\lambda_2$, but reflects signals having a wavelength of $\lambda_1$. First and second Fiber Bragg Gratings 18, 20 can help ensure that no cross-talk occurs between transmitted signal $\lambda_2$ and signals of adjacent wavelengths.

De-multiplexer 80 further includes a second output fiber 82 which is held adjacent to input fiber 12 by a two-fiber ferrule 84. Signals reflected by bandpass filter 16 can be focussed into second output fiber 82 by GRIN lens 22. Hence, the structure effectively de-multiplexes signals having a wavelength of $\lambda_2$ into output fiber 14, arid directs the rest of the signal wavelengths into second output fiber 82. The combination of the first and second Fiber Bragg Gratings 18, 20 and bandpass filter 16 ensures that the de-multiplexed signals (those having a wavelength of $\lambda_2$) exhibit the desirable sharp skirt characteristics described hereinabove.

Figure 9B:
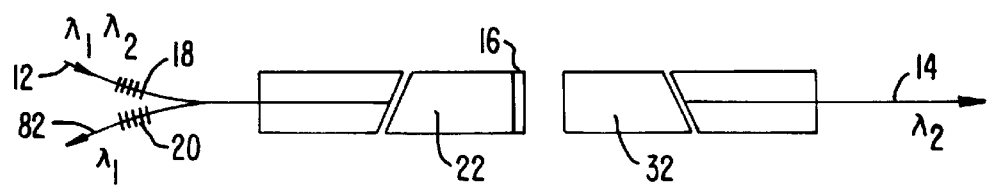

A similar arrangement is illustrated in FIG. 9B, in which the second Fiber Bragg Grating is disposed on second output fiber 82. This ensures that the reflected signal from bandpass filter 16 does not include any contamination of pass band signals having a wavelength of $\lambda_2$. Those of skill in the art will recognize that still further alternatives are possible, including multiplexers having dichroic thin film filters, the use of 1, 2, 3, or more Fiber Bragg Gratings along the input and/or output fibers, at least some of which gratings may be superimposed and/or supported by temperature compensation packages as described above.

Figure 10:
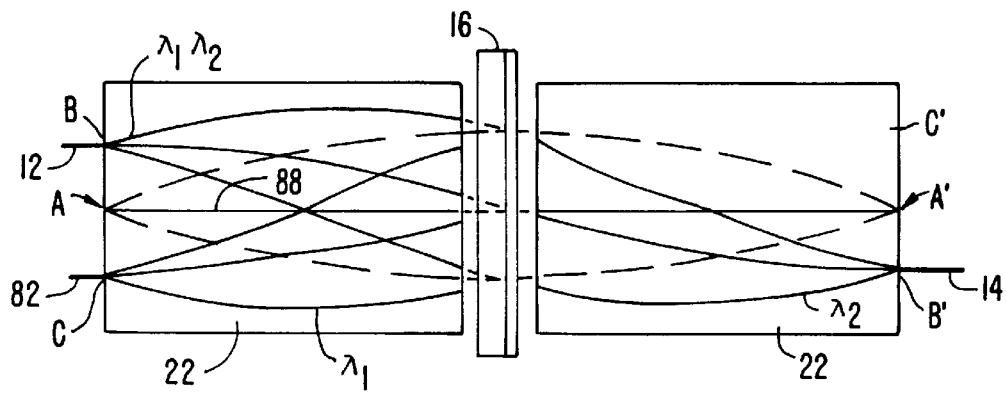
FIG. 10 schematically illustrates how a single GRIN lens can expand and collimate an optical signal from an input fiber, and can also focus a signal portion reflected by a filter into an output fiber.
Figure 11:
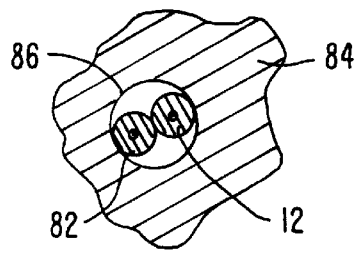
FIG. 11 is a cross-sectional view showing a ferrule holding an input and an output fiber for use in the de-multiplexers of FIGS. 9A and B.

The detailed structural arrangement of the optical components of the present invention can be understood with reference to FIGS. 9A, 10 and 11. In general, optical fibers 12, 14 and 82 are snugly held in an opening through the longitudinal axis of a glass ferrule. Each ferrule has a slant angled face which is in close proximity with a reciprocally slanted face of a quarter-pitch (or near quarter-pitch) GRIN lens. The end sections of the optical fibers are usually un-jacketed. The core and cladding of the fibers are exposed, and the exposed cladding and core may or may not be tapered. All transmission surfaces should have anti-reflective coatings to minimize insertion losses.

FIG. 11 is a cross-sectional end view of an opening 86 through two fiber ferrule 84. In this example, the end sections of input fiber 12 and second output fiber 82 are untapered, and hence, the cross-sectional diameter of each of these single mode fibers is typically about 125 μm. The diameter of opening 86 is about 250 μm to snugly accommodate the two fibers.

As can be understood with reference to FIG. 10, light which enters a quarter-pitch GRIN lens along the axis of the lens 88 is expanded and collimated. By aligning a second GRIN lens in the optical path of the optical signal transmitted through bandpass filter 16, the pass band signal may be focussed into output fiber 14, the two quarter-pitch GRIN lenses acting as a half-pitch GRIN lens which has been split into two equal parts.

Theoretically, GRIN lenses 22 share a common longitudinal axis 88, and a point source of light A at one end surface which is on axis 88 will appear at a point A' at the opposite end surface of the lens, A' also being on axis 88. This is shown by tracing of rays from point A to A'. Light from a point source B which is slightly offset from axis 88 is transmitted to a point B' which is correspondingly offset from axis 88, as shown. Similarly, signals reflected from the pass band filter between GRIN lenses 22 can be directed slightly off the longitudinal axis 88 so as to appear at a point C slightly removed from longitudinal axis 8B.

As illustrated in FIG. 11, input fiber 12 and second output fiber 82 fit snugly within ferrule 84. However, the cladding of fibers 12, 82 maintain a distance between their cores. Hence, the ends of the input fiber and second output fiber will often be arranged with respect to GRIN lens 22 so that each core is slightly removed from the longitudinal axis. By correspondingly arranging output fiber 14 offset an equal amount from axis 88 (for example, by including a spacing fiber at C'), light from the input fiber which passes through bandpass filter 16 may be accurately focussed at the output fiber.

It should be noted that such positioning of the fiber ends with respect to the longitudinal axis, as called for by the theoretical operation of GRIN lenses, is an idealization. Empirically, it has been found that fine adjustments may still be required to achieve maximum performance. Additionally, as mentioned above, the pitch of the GRIN lenses may be slightly less, or slightly more, than a true quarter-pitch, so that the light from each of the input fibers is not refocussed at a point. In some embodiments, the ends of the output fibers may be formed with a properly enlarged core to increase the transfer of light, and to keep the fractional losses low. The use and structure of such GRIN lenses is described in more detail in co-pending U.S. Patent application Ser. No. 08/623,489, filed Mar. 28, 1996, the full disclosure of which is hereby incorporated by reference.

While the above description provides a full and complete disclosure of the preferred embodiments of the present invention, various modifications, alternative constructions, and equivalents will be obvious to those of skill in the art. Thus, the scope of the present invention is limited solely by the appended claims.

What is claimed is:

1. An optical filter system comprising:

an input optical fiber;

a filter disposed in an optical path of an optical signal from the input fiber, the filter transmitting the signal in a pass wavelength range, blocking the signal in a block wavelength range, and partially transmitting and partially blocking signals throughout a skirt wavelength range separating the pass range and the block range;

a first Fiber Bragg Grating disposed in the optical path from the input fiber, the first Fiber Bragg Grating blocking at least a portion of the signal within the skirt range of the filter; and an output optical fiber disposed in the path of the signal from the filter and the first Fiber Bragg Grating so that the filter system partially transmits and partially blocks the signal from the input fiber to the output fiber throughout a skirt wavelength range of the filter system, wherein the skirt range of the filter system is significantly smaller than the skirt range of the filter.

2. The filter system of claim 1, wherein the filter comprises a plurality of thin film coating layers disposed across the optical path of the signal, wherein the coating layers transmit the signal in the pass range of the filter and block the signal in the block range of the filter.

3. The filter system of claim 1, further comprising a second fiber Bragg Grating in the path of the signal, wherein the filter comprises a bandpass filter that blocks the signal below a pass wavelength range, transmits the signal within the pass wavelength range, and blocks the signal above the pass wavelength range, the pass wavelength range having a minimum pass wavelength and a maximum pass wavelength, wherein the first Fiber Bragg Grating blocks the signal near the minimum pass wavelength range, and wherein a second Fiber Bragg Grating blocks the signal near the maximum pass wavelength range.

4. The filter system of claim 3, wherein the Fiber Bragg Gratings are disposed between the input fiber and the filter.

5. The filter system of claim 3, wherein the filter is disposed between the first and second Fiber Bragg Gratings.

6. The filter system of claim 3, wherein the thin film filter is disposed between the input fiber and the Fiber Bragg Gratings.

7. The filter system of claim 3, wherein the Fiber Bragg Gratings are at least partially superimposed.

8. The filter system of claim 7, further comprising a temperature compensation structure supporting the Fiber Bragg Gratings such that tension in the Fiber Bragg Gratings decreases with increasing temperature and temperature induced variations in wavelength response of the Fiber Bragg Gratings are reduced.

9. The filter system of claim 1, wherein the thin film filter comprises a dichroic filter.

10. The filter system of claim 9, wherein the dichroic filter comprises a low pass filter.

11. The filter system of claim 9, wherein the dichroic filter comprises a high pass filter.

12. The filter system of claim 1, further comprising:

another output fiber disposed adjacent the input fiber;

a first GRIN lens disposed along the path between the input fiber and the filter; and a second GRIN lens disposed along the path between the filter and the output fiber;

wherein at least a portion of the signal from the first GRIN lens is reflected by the filter back through the first GRIN lens and into the other output fiber.

13. An optical filter system comprising:

an input optical fiber;

a thin film bandpass filter disposed in an optical path of an optical signal from the input fiber, the bandpass filter transmitting the optical signal in a pass wavelength range, the pass range extending from a low pass wavelength to a high pass wavelength, the bandpass filter blocking the optical signal below and above the pass range;

an output optical fiber in the optical path from the bandpass filter;

a first Fiber Bragg Grating disposed in the optical path between the input fiber and the output fiber, the first Fiber Bragg Grating blocking optical signals adjacent the low pass wavelength;

a second Fiber Bragg Grating disposed in the optical path between the input fiber and the output fiber, the second Fiber Bragg Grating blocking optical signals adjacent the high pass wavelength.

14. The filter system of claim 13, further comprising first and second GRIN lenses, wherein the bandpass filter is disposed between the GRIN lenses, and wherein the first GRIN lens is disposed between at least one of the first and second Fiber Bragg Grating and the bandpass filter.

15. An optical filter system comprising:

an input optical fiber;

first and second output optical fibers;

a thin film dichroic filter in an optical path of an optical signal from the input fiber, the dichroic filter directing the optical signal below a skirt wavelength range toward the first output fiber, the dichroic filter directing the optical signal above the skirt wavelength range toward the second output fiber;

a first Fiber Bragg Grating disposed in the optical path between the input fiber and the dichroic filter, the first Fiber Bragg Grating blocking optical signals within the skirt wavelength range.

16. The filter system of claim 15, further comprising a first GRIN lens disposed in the path between the first Fiber Bragg Grating and the dichroic filter, a second GRIN lens disposed between the dichroic filter and one of the output fibers, and a second Fiber Bragg Grating disposed between the first Fiber Bragg Grating and one of the output fibers.

* * * * *